United States Patent
Jaffri et al.

(10) Patent No.: US 10,963,653 B2
(45) Date of Patent: Mar. 30, 2021

(54) BIOPTIC BARCODE READER WITH CAPACITIVELY COUPLED RADIO-FREQUENCY ANTENNA

(71) Applicant: ZEBRA TECHNOLOGIES CORPORATION, Lincolnshire, IL (US)

(72) Inventors: Rehan K. Jaffri, New York, NY (US); Mark W. Duron, Mastic, NY (US); Sean Connolly, Stony Brook, NY (US)

(73) Assignee: Zebra Technologies Corporation, Lincolnshire, IL (US)

( * ) Notice: Subject to any disclaimer, the term of this patent is extended or adjusted under 35 U.S.C. 154(b) by 0 days.

(21) Appl. No.: 16/538,538

(22) Filed: Aug. 12, 2019

(65) Prior Publication Data

US 2021/0049330 A1    Feb. 18, 2021

(51) Int. Cl.
*G06K 7/00* (2006.01)
*G06K 7/10* (2006.01)
*G06K 7/14* (2006.01)

(52) U.S. Cl.
CPC ....... *G06K 7/0004* (2013.01); *G06K 7/10326* (2013.01); *G06K 7/10831* (2013.01); *G06K 7/1413* (2013.01)

(58) Field of Classification Search
CPC .................................................. G06K 7/0004
USPC .................................. 235/440, 375; 340/10.1
See application file for complete search history.

(56) References Cited

U.S. PATENT DOCUMENTS

| | | | |
|---|---|---|---|
| 7,620,568 B1* | 11/2009 | Parker-Malchak | ........................ G06Q 10/087 235/375 |
| 2012/0105205 A1* | 5/2012 | Claessen | ............. G07G 1/0018 340/10.1 |
| 2013/0056285 A1* | 3/2013 | Meagher | ............ G01G 19/4144 177/1 |
| 2013/0075168 A1* | 3/2013 | Amundsen | ......... G06K 7/10594 177/1 |
| 2013/0193208 A1* | 8/2013 | Collins | ............. G06K 7/10821 235/440 |
| 2014/0061305 A1* | 3/2014 | Nahill | ................. G06K 7/1096 235/438 |

* cited by examiner

*Primary Examiner* — Allyson N Trail
(74) *Attorney, Agent, or Firm* — Yuri Astvatsaturov

(57) ABSTRACT

A bioptic barcode reader configured to be supported by a workstation and having a lower housing with a platter having a generally horizontal window and a tower extending generally perpendicular to the lower housing and having a generally vertical window. A radio-frequency identification radio is positioned within the lower housing and is communicatively coupled to a feed patch positioned within the lower housing and proximate, but spaced apart from, the platter such that the feed patch is capacitively coupled to the platter and configured to energize the platter such that the platter is operative as a radio-frequency identification reader antenna.

22 Claims, 4 Drawing Sheets

BIOPTIC BARCODE READER WITH CAPACITIVELY COUPLED RADIO-FREQUENCY ANTENNA

FIELD OF THE DISCLOSURE

The present patent relates generally to bioptic barcode readers and, in particular, to bioptic barcode readers having radio-frequency identification (RFID) antenna arrangements for reading RFID tags.

BACKGROUND

RFID tags are increasingly being used to track, locate, and check inventory on items. In a retail environment, RFID tags help determine whether an item is on the shelf, available in the back room, in the wrong location, or is no longer in the store. When an item having an RFID tag is read last by an RFID reader near the store exit, it currently cannot be determined whether the particular item has been sold, stolen, or not in the store for another reason.

There is a need to be able to identify whether an item having an RFID tag was sold or was in close proximity to a point of sale (POS), such as a bioptic barcode reader used at the POS, which will help in reporting accuracy on items sold and in keeping track of inventory and reporting shrink. However, bioptic barcode readers used at POS stations are compact designs with limited volume and locations for integrating additional electronics, such as an RFID radio and RFID antennas. In addition, the metal enclosures of bioptic barcode readers are highly restrictive radio frequency (RF) environments.

BRIEF DESCRIPTION OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed examples, and explain various principles and advantages of those embodiments.

Figure 1:
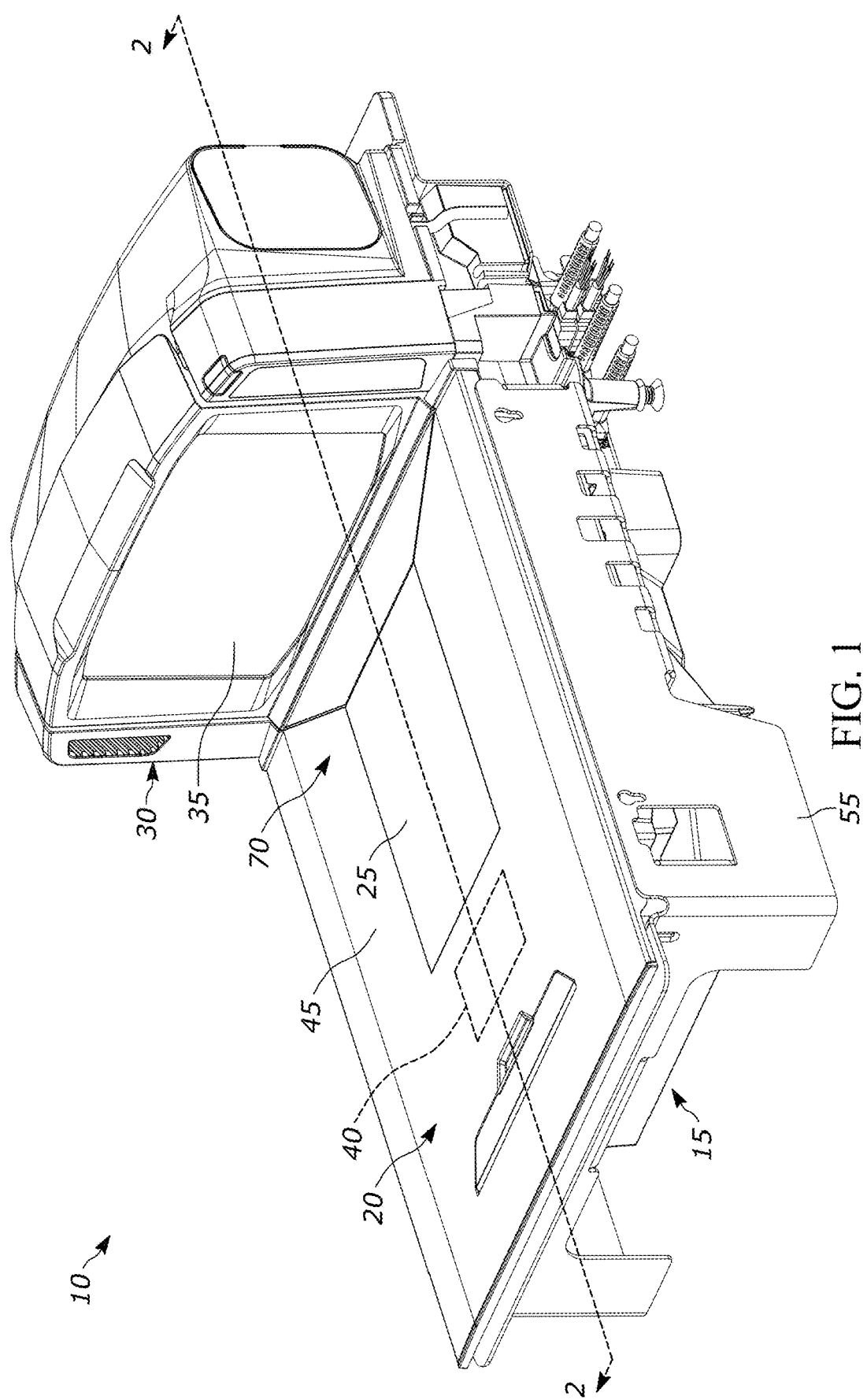
FIG. 1 illustrates a front perspective view of an example bioptic barcode reader.

The apparatus and method components have been represented where appropriate by conventional symbols in the drawings, showing only those specific details that are pertinent to understanding the disclosed examples so as not to obscure the disclosure with details that will be readily apparent to those of ordinary skill in the art having the benefit of the description herein.

DETAILED DESCRIPTION

The examples disclosed herein relate to bioptic barcode readers having RFID tag reading capability to address the problem, or accuracy, of tracking an item sold and/or no longer in a retail location. Although an RFID radio can be integrated into the shielded enclosure of a bioptic barcode reader, finding a location to integrate an RFID antenna is still a problem. Using the metal platter of the bioptic barcode reader as an RFID antenna provides a possible solution to the problem, however, the platter still needs to be connected to the RFID radio to complete the RFID system integration and the platters of bioptic barcode readers are typically highly sensitive weight scales that do not allow physical connection to the platters for validation and certification reasons. Physical points of contact cannot be made to the platter antenna due to the weight scale restrictions.

Therefore, the example bioptic barcode readers herein include a feed patch that is coupled to an RFID radio within the bioptic barcode reader and is located directly under, but spaced part from, the platter of the bioptic barcode reader so that the feed patch is capacitively coupled to the platter and configured to energize the platter so that the platter is operative as an RFID antenna. This allows the utilization of the platter as an RFID antenna and connects the platter to the RFID radio without making physical contact with the platter. Additionally, using the platter as the RFID antenna located on the top surface of the bioptic barcode reader with the large number of metal reflectors (e.g., the scale, chassis, etc.) right below it has the added advantage of providing directional high gain radiation upwards which helps read RFID tags in a product scanning region of the bioptic barcode reader.

Figure 2:
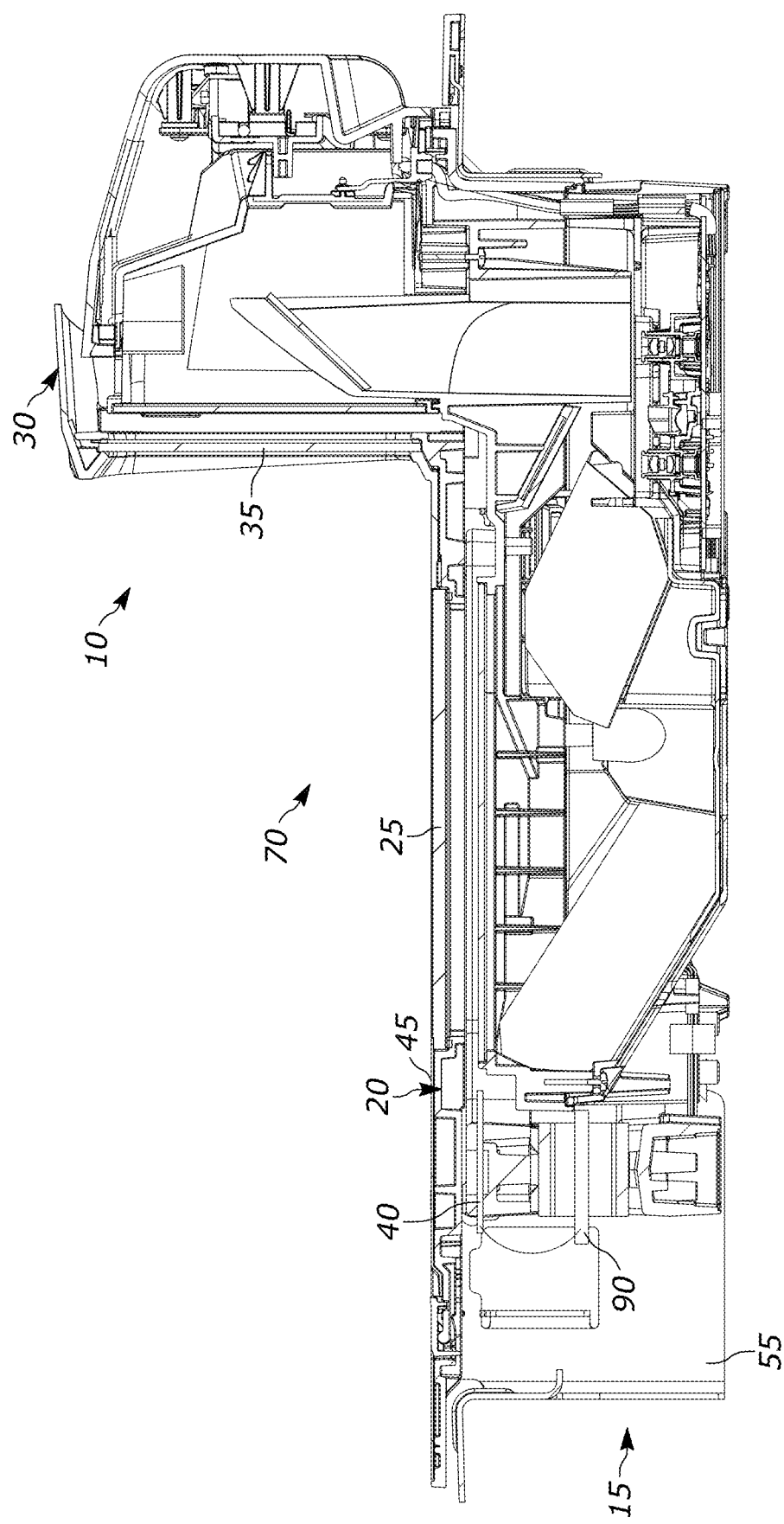
FIG. 2 illustrates a side cross-sectional view of the example bioptic barcode reader of FIG. 1 taken along line 2-2 of FIG. 1.

Referring to FIGS. 1-2, a first example bioptic barcode reader 10 is shown, which can be configured to be supported by a workstation. Bioptic barcode reader 10 includes a lower housing 15 having a platter 20, which can be a weighing platter, that includes a generally horizontal window 25. Horizontal window 25 is positioned within platter 20 to allow a first set of optical components positioned within lower housing 15 to direct a first field of view through horizontal window 25. A tower portion 30 extends generally perpendicular to lower housing 15 and includes a generally vertical window 35 that is positioned within tower portion 30 to allow a second set of optical components positioned within tower portion 30 to direct a second field of view through vertical window 35. The first and second fields of view define a product scanning region 70 of the bioptic barcode reader 10 where a product can be scanned for sale at the point of sale.

As best seen in FIG. 2, an RFID radio 90 is positioned within lower housing 15 and is communicatively coupled to a feed patch 40, which is positioned within lower housing 15 below platter 20, through a wired connection or any other desired mode of communication. Feed patch 40 is positioned proximate platter 20, but spaced apart from platter 20, such that feed patch 40 is capacitively coupled to platter 20 and is configured to energize platter 20 so that platter 20 is communicatively coupled to RFID radio 90 and is operative as an RFID antenna.

Figure 4:
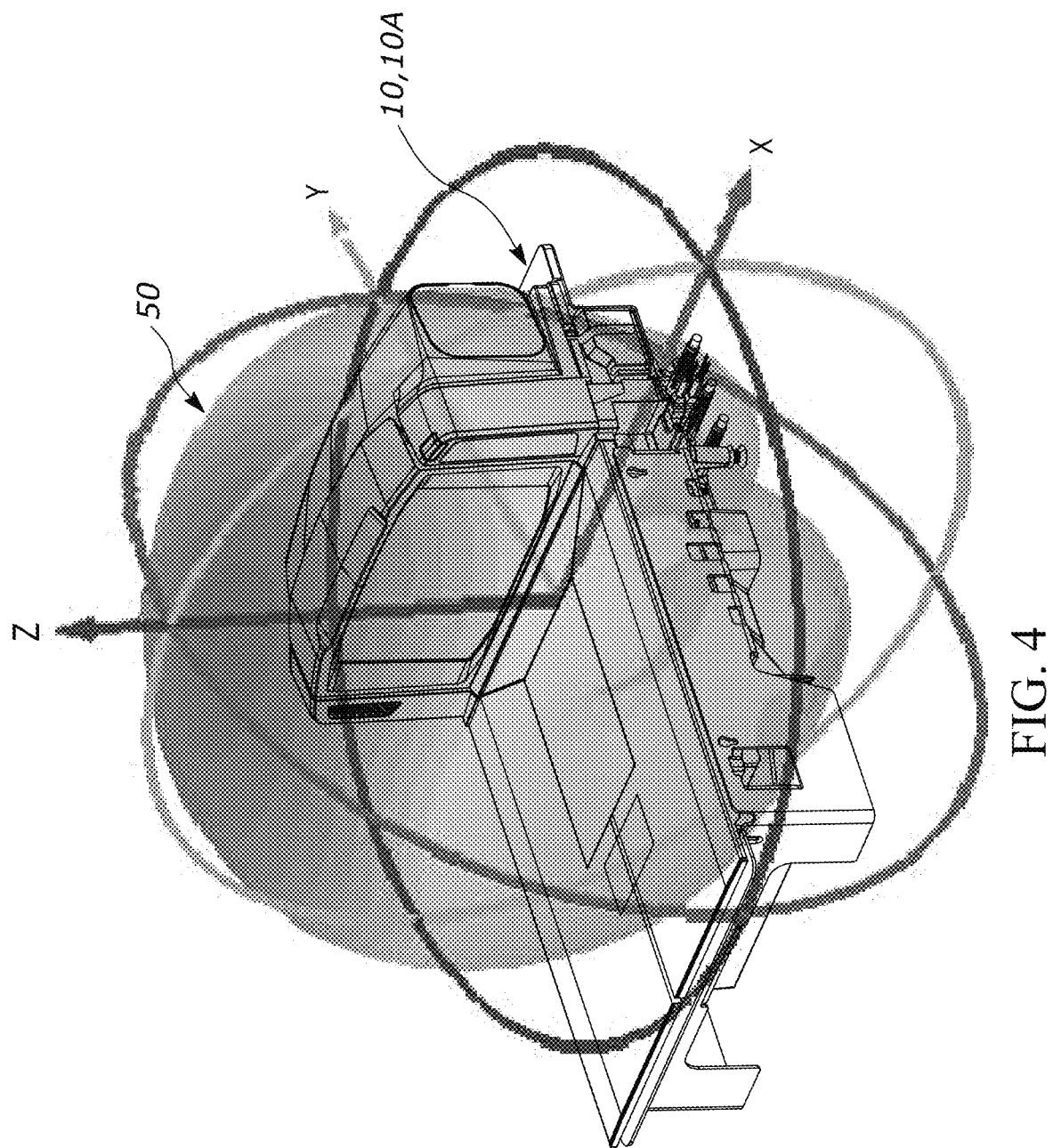
FIG. 4 illustrates a radiation pattern emitted by the energized platter of the example bioptic scanners of FIGS. 1 and 3.

When energized by feed patch 40, platter 20 emits a radiation pattern 50 that is oriented in a direction, the Z axis in FIG. 4, generally perpendicular to a top surface 45 of platter 20, as shown in FIG. 4. Capacitively coupling feed patch 40 to platter 20 allows platter 20 to be used as an RFID antenna without any physical connection between platter 20 and RFID radio 90 and allows RFID tags to be scanned by energizing platter 20 with feed patch 40.

To further direct the RF radiation from platter 20 towards product scanning region 70 when platter 20 is energized by feed patch 40, RFID radio 90 can be positioned within lower housing 15 and oriented to act as a reflector to reflect RF energy from platter 20 towards product scanning region 70. Alternatively, when not used as a reflector, RFID radio 90 can also be positioned outside of lower housing 15 of bioptic barcode reader 10 so that RFID radio 90 does not act as another potential reflective surface within lower housing 15. In addition, chassis 55 of lower housing 15 can be metallic and also act as a reflector for platter 20 when platter 20 is energized by feed patch 40.

Figure 3:
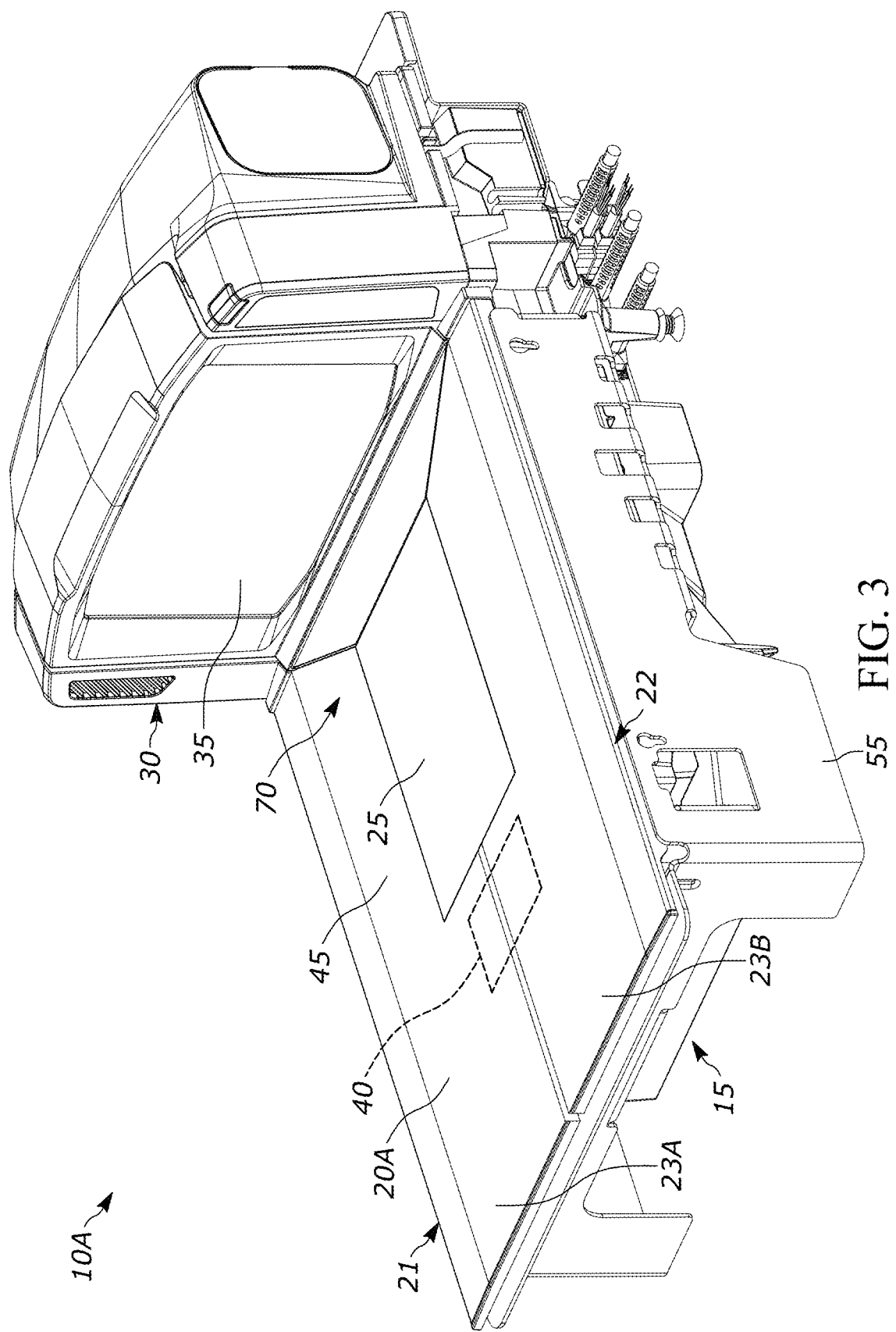
FIG. 3 illustrates a front perspective view of another example bioptic barcode reader.

Referring to FIG. 3, a second example bioptic barcode reader 10A is shown, which can be configured to be supported by a workstation. Bioptic barcode reader 10A has the same basic components of bioptic barcode reader 10 described above, except that bioptic barcode reader 10A includes platter 20A, which could be a weighing platter, instead of platter 20. Platter 20A is a two-piece platter having a first portion 21 and a second portion 22 that is spaced apart from and insulated from first portion 21, with horizontal window 25 located between first portion 21 and second portion 22. First and second portions 21, 22, of platter 20A have flat top surfaces 23A, 23B, respectively, that are parallel to each other and together form top surface 45 of platter 20A.

Feed patch 40 is positioned in the same position within lower housing 15 below platter 20 and is positioned so that it is underneath and spaced apart from both first portion 21 and second portion 22 so that feed patch 40 is capacitively coupled to both first portion 21 and second portion 22 of platter 20 and is configured to energize first portion 21 and second portion 22 such that platter 20 is communicatively coupled to RFID radio 90 and is operative as an RFID antenna.

When energized by feed patch 40, feed patch 40 energizes first portion 21 and second portion 22 to generate a dipole such that platter 20A emits the same radiation pattern 50 described above for platter 20 and shown in FIG. 4. The use of feed patch 40 spaced apart from and capacitively coupled to platter 20A allows platter 20A to be used as an RFID antenna without any physical connection between platter 20A and RFID radio 90 and allows RFID tags to be scanned by energizing platter 20A with feed patch 40.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. Additionally, the described embodiments/examples/implementations should not be interpreted as mutually exclusive, and should instead be understood as potentially combinable if such combinations are permissive in any way. In other words, any feature disclosed in any of the aforementioned embodiments/examples/implementations may be included in any of the other aforementioned embodiments/examples/implementations. Moreover, no steps of any method disclosed herein shall be understood to have any specific order unless it is expressly stated that no other order is possible or required by the remaining steps of the respective method. Also, at least some of the figures may or may not be drawn to scale.

The benefits, advantages, solutions to problems, and any element(s) that may cause any benefit, advantage, or solution to occur or become more pronounced are not to be construed as a critical, required, or essential features or elements of any or all the claims. The legal scope of the property right is defined solely by the appended claims including any amendments made during the pendency of this application and all equivalents of those claims as issued.

Moreover, in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The patent claims at the end of this patent application are not intended to be construed under 35 U.S.C. § 112(f) unless traditional means-plus-function language is expressly recited, such as "means for" or "step for" language being explicitly recited in the claim(s).

The Abstract is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

The invention claimed is:

1. A bioptic barcode reader configured to be supported by a workstation, the bioptic barcode reader comprising:
    a lower housing and a tower extending generally perpendicular to the lower housing, the lower housing having a top lower-housing surface and the tower having a generally vertical window;
    a platter positioned above the top lower-housing surface and having a generally horizontal window;
    a radio-frequency identification radio positioned within the lower housing; and
    a feed patch positioned within the lower housing and proximate, but spaced apart from, the platter; wherein the feed patch is communicatively coupled to the radio-frequency identification radio; and
    the feed patch is capacitively coupled to the platter and configured to energize the platter such that the platter is operative as a radio-frequency identification antenna.

2. The bioptic barcode reader of claim 1, wherein the platter emits a radiation pattern oriented in a direction generally perpendicular to a top surface of the platter when the platter is energized by the feed patch.

3. The bioptic barcode reader of claim 1, wherein the platter is a weighing platter.

4. The bioptic barcode reader of claim 1, wherein the radio-frequency identification radio is oriented to act as a reflector for the platter when the platter is energized by the feed patch.

5. The bioptic barcode reader of claim 1, wherein a chassis of the lower housing is metallic and acts as a reflector for the platter when the platter is energized by the feed patch.

6. A bioptic barcode reader configured to be supported by a workstation, the bioptic barcode reader comprising:
    a lower housing and a tower extending generally perpendicular to the lower housing, the lower housing having a top lower-housing surface and the tower having a generally vertical window;
    a platter positioned above the top lower-housing surface and having a first portion and a second portion insulated from the first portion and a generally horizontal window;
    a radio-frequency identification radio positioned within the lower housing; and
    a feed patch positioned within the lower housing and proximate, but spaced apart from, the first portion and the second portion of the platter; wherein the feed patch is communicatively coupled to the radio-frequency identification radio and capacitively coupled to the first portion and the second portion of the platter; and
    the feed patch is configured to energize the first portion and the second portion of the platter such that the platter is operative as a radio-frequency identification antenna.

7. The bioptic barcode reader of claim 6, wherein the first and second portions of the platter have parallel flat top surfaces.

8. The bioptic barcode reader of claim 6, wherein the platter emits a radiation pattern oriented in a direction generally perpendicular to a top surface of the platter when the platter is energized by the feed patch.

9. The bioptic barcode reader of claim 6, wherein the platter is a weighing platter.

10. The bioptic barcode reader of claim 6, wherein the radio-frequency identification radio is oriented to act as a reflector for the platter when the platter is energized by the feed patch.

11. The bioptic barcode reader of claim 6, wherein a chassis of the lower housing is metallic and acts as a reflector for the platter when the platter is energized by the feed patch.

12. A method of reading a radio-frequency identification tag proximate a bioptic barcode reader, comprising the steps of:
    positioning a radio-frequency identification radio within a lower housing of the bioptic barcode reader;
    positioning a feed patch within the lower housing and proximate, but spaced apart from, a platter positioned above a top lower-housing surface of the lower housing such that the feed patch is capacitively coupled to the platter, the platter having a generally horizontal window;
    coupling the feed patch to the radio-frequency identification radio; and
    scanning for the radio-frequency identification tag by energizing the platter with the feed patch.

13. The method of claim 12, wherein the platter emits a radiation pattern oriented in a direction generally perpendicular to a top surface of the platter when the platter is energized by the feed patch.

14. The method of claim 12, wherein the platter is a weighing platter.

15. The method of claim 12, further comprising the step of orienting the radio-frequency identification radio with the lower housing to act as a reflector for the platter when the platter is energized by the feed patch.

16. The method of claim 12, wherein a chassis of the lower housing is metallic and acts as a reflector for the platter when the platter is energized by the feed patch.

17. A method of reading a radio-frequency identification tag proximate a bioptic barcode reader, comprising the steps of:
    positioning a radio-frequency identification radio within a lower housing of the bioptic barcode reader;
    positioning a feed patch within the lower housing and proximate, but spaced apart from, a first portion and a second portion of a platter positioned above a top lower-housing surface of the lower housing such that the feed patch is capacitively coupled to the first portion and the second portion, the platter having a generally horizontal window, the first portion being insulated from the second portion;

coupling the feed patch to the radio-frequency identification radio; and scanning for the radio-frequency identification tag by energizing the platter with the feed patch.

18. The method of claim 17, wherein the first and second portions of the platter have parallel flat top surfaces.

19. The method of claim 17, wherein the platter emits a radiation pattern oriented in a direction generally perpendicular to a top surface of the platter when the platter is energized by the feed patch.

20. The method of claim 17, wherein the platter is a weighing platter.

21. The method of claim 17, further comprising the step of orienting the radio-frequency identification radio within the lower housing to act as a reflector for the platter when the platter is energized by the feed patch.

22. The method of claim 17, wherein a chassis of the lower housing is metallic and acts as a reflector for the platter when the platter is energized by the feed patch.

\* \* \* \* \*